Figure 1:
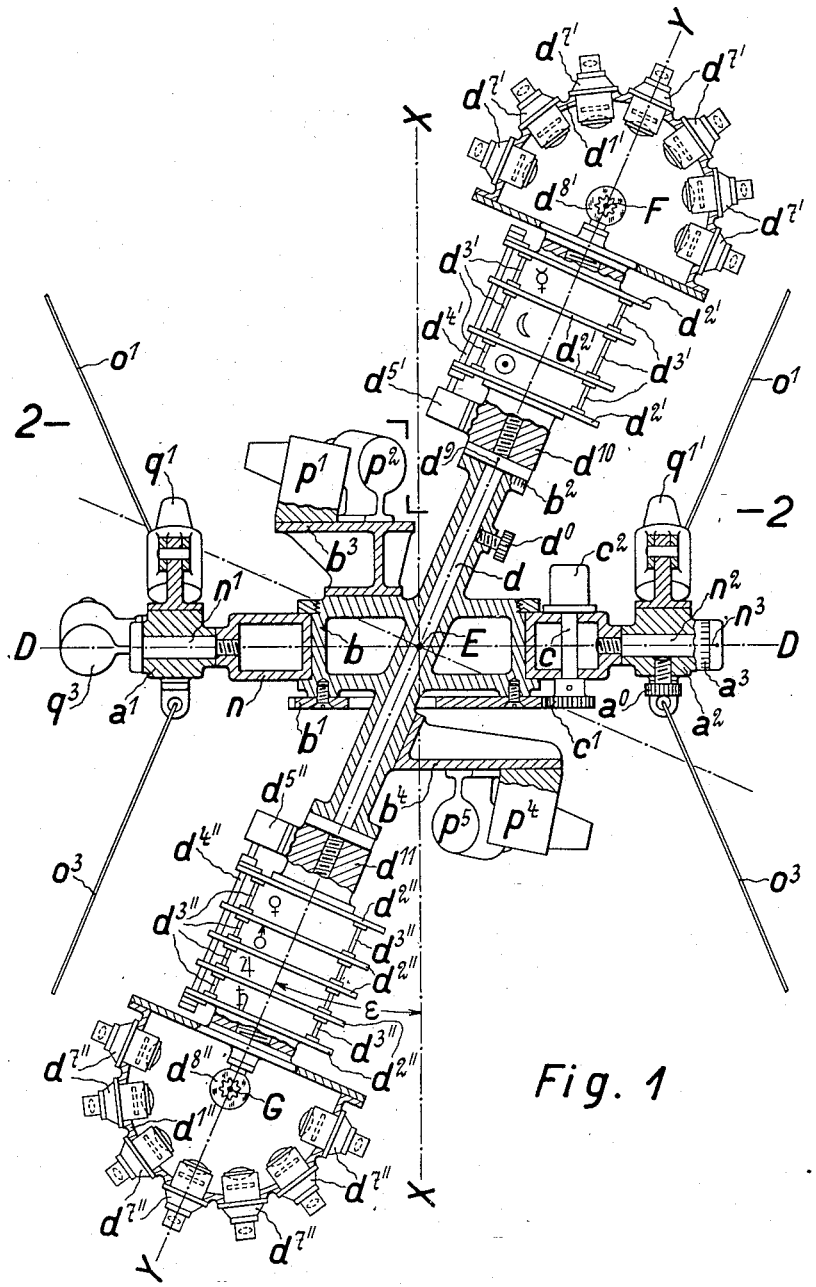

Dec. 4, 1928.

W. VILLIGER ET AL 1,693,969

DEVICE FOR PROJECTING STARS

Filed Dec. 3, 1925  3 Sheets—Sheet 2

Inventors:
Walter Villiger
Walther Bauersfeld.

Patented Dec. 4, 1928.

1,693,969

UNITED STATES PATENT OFFICE.

WALTER VILLIGER AND WALTHER BAUERSFELD, OF JENA, GERMANY, ASSIGNORS TO CARL ZEISS (A FIRM), OF JENA, GERMANY.

DEVICE FOR PROJECTING STARS.

Application filed December 3, 1925, Serial No. 73,019, and in Germany December 11, 1924.

The present invention relates to a device for projecting stars, as dealt with in the co-pending application Serial No. 668,446, filed October 13, 1923. Patent No. 1,616,736.

If a device of this kind is to be based upon a small latitude (in the utmost case the latitude zero), the form represented in the said application does not admit any more of representing the whole fixed-star sky. According to the invention this representation is achieved by disposing the devices for projecting fixed stars round two sources of light and by locating them relatively to the latter, and constructing them in such a way that with the projection the same effect is attained as if the projection would take place from a common centre of projection. Thereby the latter need not lie at all events in one of the two sources of light itself. A displacement of the centre of projection may be compensated in a different way, e. g. by a corresponding arrangement of the stars on the plates to be projected or by altering the inclination of the projection apparatus or, finally, by a corresponding selection of the focal length of the projection objectives and by a suitable lateral displacement of these objectives. This division of the devices serving for the projection of the fixed stars also affords the prevention of objectionable castings of shadow of the devices serving for the projection of the bodies of the solar system with the representation of the whole fixed-star sky. These latter devices may henceforth be disposed between the two groups of devices serving for the projection of fixed stars, so that they lie outside the path of rays of these devices.

In the device represented in the copending application it might be possible, as may be easily seen, to achieve a compensation of the weights relatively to the axis of rotation, parallel to the earth axis, only by using special counterpoise. However, according to the invention such a compensation without counterpoise is attained by an arrangement with which the centre of gravity of the devices for projecting the fixed stars, on the one hand, and that of the devices for projecting the bodies of the solar system, on the other hand, lie outside the said axis of rotation on different sides of it. Thereby the devices, disposed round a common source of light, for projecting the fixed stars must be located relatively to the source of light and constructed in such a way that the projection seems to take place from a centre of projection which, while lying on the said axis of rotation, is displaced relatively to the source of light.

In order to be able to adjust any desired inclinations of the earth axis to the horizon, it is advisable to dispose the carrying appliance, in which the devices for projecting the fixed stars and the bodies of the solar system are supported about an axis parallel to the earth axis, rotatable about a horizontal axis intersecting the said former axis of rotation, and thereby to construct the carrying appliance in such a way as to render possible rotations of the pedestal body about any desired angles.

In devices for projecting stars it is impossible to use the usual thick-walled carrying appliances because in certain positions of the moved parts they would prevent the light of the projection apparatus from striking the protection screen and thereby cause temporary eclipses of the stars. Hence, only such carrying appliances can be used whose constructional parts are of small strength perpendicular to the direction of projection (i. e. tangential to the projection screen). It is of particular advantage to only make the carrying appliance of stay wires.

Figure 2:
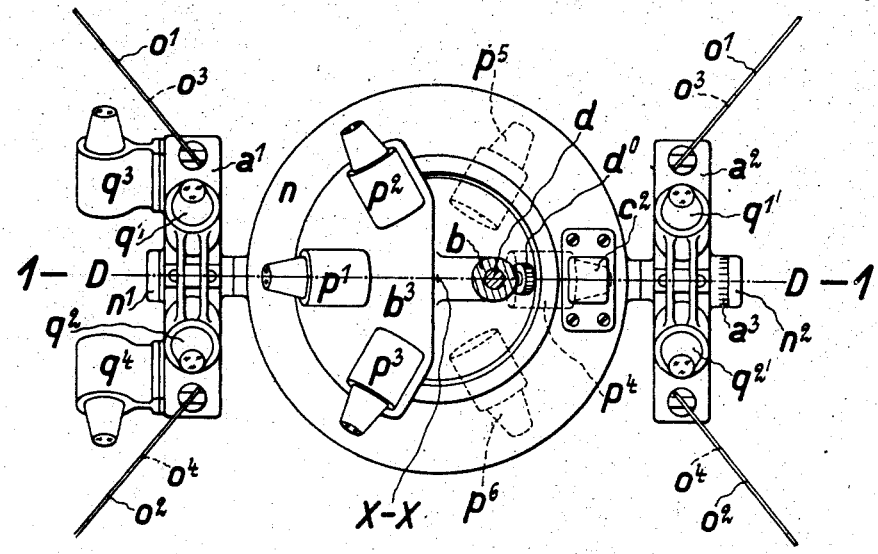
Figure 3:
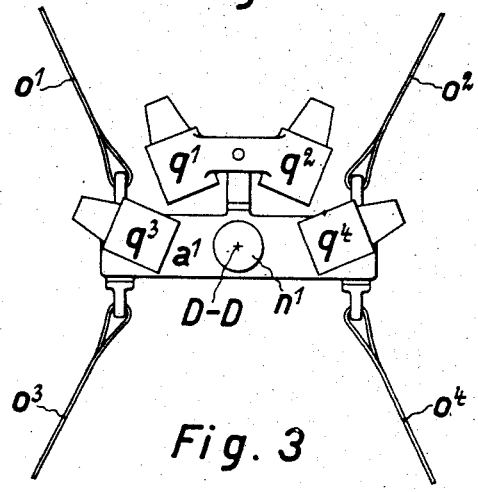
Figure 4:
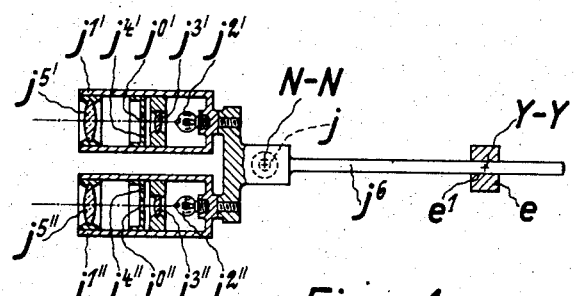
Figure 5:
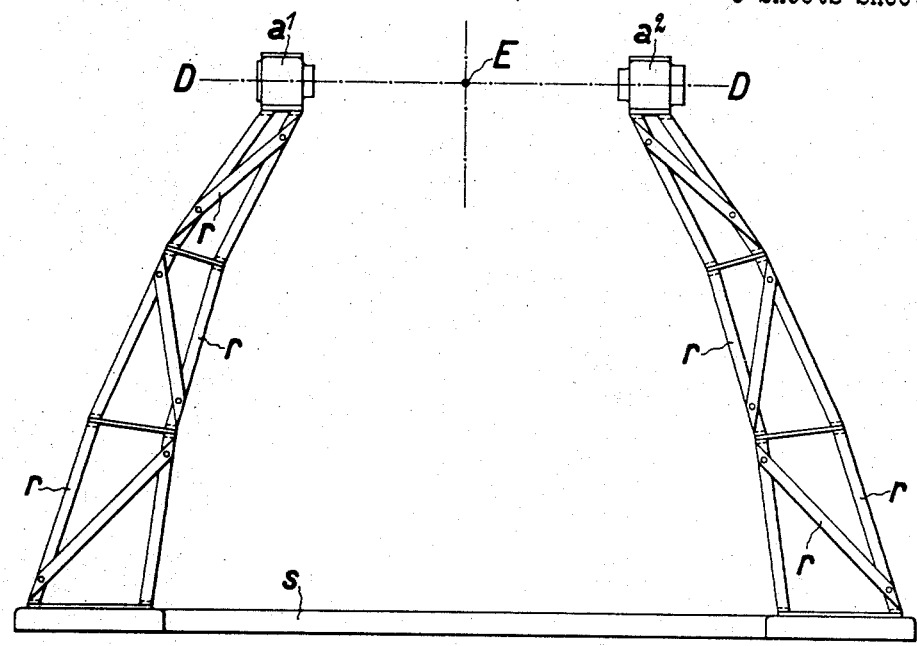
Figure 6:
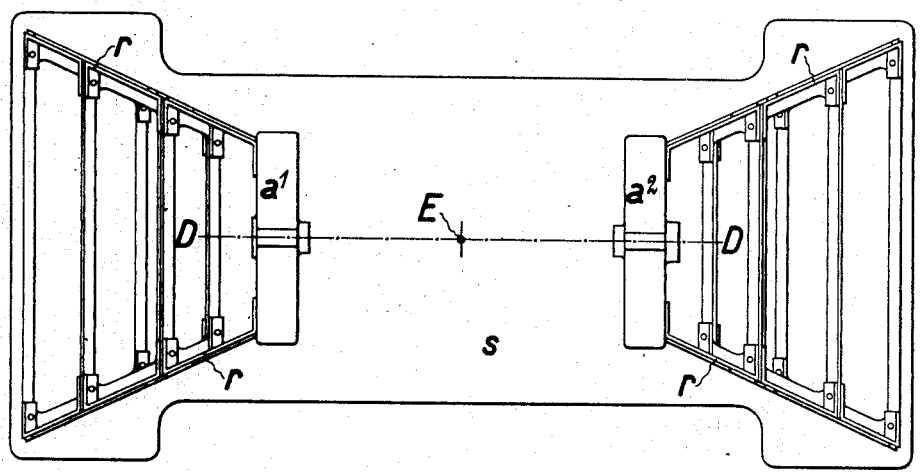

The annexed drawing shows in Figs. 1 to 3 an example of the invention; Fig. 1 is an elevation, partly in section, Fig. 2 is a section on the line 2—2 of Fig. 1 and Fig. 3 a sideview. Fig. 4 is a detail of a second example in a section. Figs. 5 and 6 show in an elevation and in plan a second form of the carrying appliance for the device according to Figs. 1 to 3. The reference letters agree as far as possible with those of the copending application.

The device shown in Figs. 1 to 3 serves for projecting the fixed stars, the sun ☉, the moon ☾, and the planets Mercury ☿, Venus ♀, Mars ♂, Jupiter ♃ and Saturn ♄ and for illustrating the motion of these celestial bodies relatively to the earth on the projection screen in such a way as perceived from a certain definite point on the earth. In these figures the mechanisms for producing the motion of the parts requisite for the projection of the celestial bodies ☉, ☾, ☿, ♀, ♂, ♃ and ♄ have, for clearness, been left out for the most part and only the appertaining astronomical sign has been inscribed at the place where the corresponding mechanisms must be fitted. The mechanisms may entirely correspond to those shown in the constructional example of the German patent specification 391036, so that it was unnecessary to illustrate them in this case.

The new device differs in the first place from the one described in the copending application by the fact that the latitude is adjustable. For this purpose the carrying body $b$ in which the shaft $d$ is supported rotatably about the axis Y—Y, which embraces with the axis of rotation X—X of the carrying body $b$ the angle $\epsilon = 23\frac{1}{2}°$, is not directly supported rotatably on a stand rigidly fitted but on a body $n$, which by means of two pivots $n^1$ and $n^2$ is supported on two carrying bars $a^1$ and $a^2$ rotatable about an axis D—D in such a way that this axis is perpendicular to the axis of rotation X—X and thereby traverses the point of intersection E of the axes of rotation X—X and Y—Y. The carrying bars $a^1$ and $a^2$ are assumed to be suspended with the aid of ropes $o^1$ and $o^2$ within a suitable spherical projection screen in such a way that the point of intersection E lies in the centre of the projection room and that the axis of rotation D—D is horizontal, whereby other ropes $o^3$ and $o^4$ ensure an invariable position of the carrying bars $a^1$ and $a^2$. By rotating the body $n$ about the axis of rotation D—D it is possible to impart to the axis of rotation X—X, representing the earth axis, any desired position relatively to the horizontal plane determined by the axis of rotation D—D, so that any desired latitude will be adjustable. The latitude adjusted at any one time is indicated by an index $n^3$ of the pivot $n^2$ on a scale $a^3$ of the carrying bar $a^2$. In the drawing the arrangement has been made in such a way that the axis of rotation X—X is vertical, hence the device is adjusted according to a latitude of 90°. In order to secure the latitude chosen, provision is made for a set-screw $a^0$ by means of which the body $n$ may be fixed relatively to the carrying bars $a^1$ and $a^2$.

The carrying body $b$ is actuated by means of a pair of toothed wheels $b^1$, $c^1$ from a shaft $c$ supported in the body $n$ and actuated by a motor $c^2$. The shaft $d$ supported rotatable about the axis Y—Y in the carrying body $b$ and fixable by a set-screw $d^0$ relatively to the carrying body $b$, contains an index $d^9$ which indicates on a scale $b^2$ of the carrying body the position at any one time of the shaft relatively to the carrying body. The shaft $d$ is screwed to two carriers $d^{10}$ and $d^{11}$. The carrier $d^{10}$ carries four plates $d^{2\prime}$ and the carrier $d^{11}$ five plates $d^{2\prime\prime}$, which are perpendicular to the axis Y—Y and screwed together with the aid of bolts $d^{3\prime}$ and $d^{3\prime\prime}$ respectively. The mechanisms for producing the motion of the parts requisite for the projection of the bodies of the solar system are assumed to be fixed between these plates, viz between the plates $d^{2\prime}$ of the carrier $d^{10}$ the mechanisms for projecting the sun, the moon and Mercury and between the plates $d^{2\prime\prime}$ of the carrier $d^{11}$ the mechanisms for projecting Venus, Mars, Jupiter and Saturn as indicated by the corresponding astronomical signs. For actuating the first-named mechanisms a shaft $d^{4\prime}$ is provided which is actuated by a motor $d^{5\prime}$ fixed on the carrier $d^{10}$, while for actuating the last-named mechanisms serves a shaft $d^{4\prime\prime}$, actuated by a motor $d^{5\prime\prime}$ fixed on the carrier $d^{11}$.

To the end plates $d^{2\prime}$ and $d^{2\prime\prime}$ two hemispherical casings $d^{1\prime}$ and $d^{1\prime\prime}$ respectively are screwed in such a way that the centre of the spheres F and G respectively lies on the axis of rotation Y—Y. On each of these two casings there is fixed a plurality of projection apparatus $d^{7\prime}$ and $d^{7\prime\prime}$ respectively, of which the drawing only shows seven on each casing and each of which serves for projecting a part of the fixed-star sky, in such a way that their axes intersect at the centre of the spheres F and G respectively. In each of the said two casings there is disposed, common to the appertaining projection apparatus, a glow lamp $d^{8\prime}$ and $d^{8\prime\prime}$ respectively, whose filaments enclose the appertaining centres of the spheres F and G respectively. The projection apparatus $d^{7\prime}$ and $d^{7\prime\prime}$ are assumed to be distributed on the casings $d^{1\prime}$ and $d^{1\prime\prime}$ in such a way that the whole northern and the southern fixed-star sky can be projected, whereby the fixed star images are so traced on the lantern slides of these projection apparatus that the projection seems to take place from the joint point of intersection E of the axes X—X, Y—Y and D—D.

In order to be able to project, on the one hand, a great circle which corresponds to the ecliptic and which results as intersecting line of the projection screen with the plane perpendicular to the axis Y—Y through E, and, on the other hand, a great circle which corresponds to the equator and which results as intersecting line of the projection screen with the plane perpendicular to the axis X—X through E, six projection apparatus are provided. Of these projection apparatus three $p^1$, $p^2$ and $p^3$ are disposed on a plate $b^3$, and further three $p^4$, $p^5$ and $p^6$ on a plate $b^4$, of the carrying body $b$ in such a way that their optical axes intersect the axis X—X. Thereby on the lantern slides of these six projection apparatus images of parts of both great circles are traced in such a way that during the projection the two circles are produced without interruption. As the equator lies in a plane, which is perpendicular to the axis X—X, its position on the projection screen does not vary with rotations of the carrying body $b$ in the body $n$. Hence, with such rotations readily results the relative motion of the equator and the ecliptic corresponding to the precession of the points of intersection of these two planes relatively to the fixed stars (i. e. corresponding to the so-called precession of the equinoxes).

In order to be further able to project on the screen a great circle corresponding to that meridian, which results as intersecting line of the screen with the plane, perpendicular to the axis D—D, through E, four projection apparatus $q^1$, $q^2$, $q^3$ and $q^4$ are fixed on a carrying bar $a^1$. As with the rotations of the carrying body $b$ about the axis X—X the projection apparatus $q^1$ and $q^2$ are made inoperative by disposing in front of the objectives of these projection apparatus parts participating in the rotation, there are fitted on the carrying bar $a^2$ two further projection apparatus $q^{1'}$ and $q^{2'}$ in such a way that the lines projected by the apparatus $q^{1'}$ and $q^{2'}$ coincide with the lines projected by the apparatus $q^1$ and $q^2$.

With the described suspension of the device by means of ropes the latter may be kept so thin that, even if only a single projection device be used for each body of the solar system, they do not impede the projection. In the event of stronger constructional parts it is advisable to use an arrangement as, e. g. illustrated in Fig. 4, which corresponds to the mechanism for projecting the sun shown in Fig. 2 of the copending application. With the new arrangement there are screwed to the guide bar $j^6$, which is, on the one hand, displaceable in a cylindrical boring $e^1$ of a guide body $e$ and, on the other hand, supported rotatably by means of a holder $j$ about an axis N—N parallel to the axis Y—Y, two projection apparatus $j^{1'}$ and $j^{1''}$ in such a way that their optical axes are parallel to the axis of the guide bar $j^6$. Each of these two projection apparatus contains a glow lamp $j^{2'}$ and $j^{2''}$ respectively, a condenser $j^{3'}$ and $j^{3''}$ respectively, a diaphragm $j^{4'}$ and $j^{4''}$ respectively, having a small aperture $j^{0'}$ and $j^{0''}$ respectively, and an objective $j^{5'}$ and $j^{5''}$ respectively. Each of the two diaphragm apertures $j^{0'}$ and $j^{0''}$ lies outside the optical axis of the appertaining projection apparatus in such a way that the images of the diaphragm apertures overlap each other on the screen during the projection. The same effect may also be attained by disposing the diaphragm apertures centrally with the optical axes of the projection apparatus and by screwing the latter to the guide bar $j^6$ in such a way that their optical axes intersect on the projection screen. Of the two projection apparatus one at most can always be covered by the carrying appliance.

Figs. 5 and 6 illustrate a carrying appliance which may be used in the place of the ropes employed in the device according to Figs. 1 to 3. The carrying appliance consists of two iron frameworks each of which is composed of two lattice carriers, formed by thin flat bars $r$ and reinforced relatively to each other. Each of the two frameworks carries one of the two carrying bars $a^1$ and $a^2$. The bars $r$ are substantially so disposed that in each bar the plane, parallel to the two broadsides and bisecting the two narrow sides, contains the vertical line through the point of intersection E of the axes X—X, Y—Y and D—D. Both frameworks rest upon a joint base-plate $s$.

We claim:

1. Device for projecting the fixed stars, containing a carrying appliance, a plurality of projection apparatus, each of which comprises an optical system and an image of a part of the fixed stars, which optical systems and images are so disposed that the projected images adjoin each other corresponding to the natural aspect, two hollow bodies, one group of the said projection apparatus being disposed at one and the other group being disposed at the other of these two hollow bodies, each hollow body containing a source of light common to all projection apparatus appertaining to this body, the said two hollow bodies being rigidly connected together and rotatably supported on the said carrying appliance, and means for rotating the said two hollow bodies.

2. Device for projecting the fixed stars, containing a carrying appliance, a plurality of projection apparatus, each of which comprises an optical system and an image of a part of the fixed stars, which optical systems and images are so disposed that the projected images adjoin each other corresponding to the natural aspect, two hollow bodies, one group of the said projection apparatus being disposed at one and the other group being disposed at the other of these two hollow bodies, each hollow body containing a source of light common to all projection apparatus appertaining to this body, the said two hollow bodies being rigidly connected together and rotatably supported on a carrying body, this carrying body being rotatably supported on the said carrying appliance, the two axes of rotation intersecting each other between the two hollow bodies and forming with each other an angle of about 23½°, and means for rotating the said two hollow bodies relatively to the said carrying appliance.

3. Device for projecting the fixed stars, containing a carrying appliance, a plurality of projection apparatus, each of which comprises an optical system and an image of a part of the fixed stars, which optical systems and images are so disposed that the projected images adjoin each other corresponding to the natural aspect, two hollow bodies, one group of the said projection apparatus being disposed at one and the other group being disposed at the other of these two hollow bodies, each hollow body containing a source of light common to all projection apparatus appertaining to this body, the said two hollow bodies being rigidly connected together and rotatably supported on a carrying body, this carrying body being rotatably supported on another body, the two axes of rotation intersecting each other between the two hollow bodies and forming with each other an angle of about 23½°, the said other body being supported on the said carrying appliance rotatable about a horizontal axis lying in the plane determined by the two other axes of rotation and being perpendicular to the axis about which the said carrying body is rotatable relatively to the said other body, and means for rotating the carrying body relatively to the said other body.

4. Device according to claim 3, the said other body being supported on the said carrying appliance rotatable about the said horizontal axis through 360°.

5. In a device according to claim 1, the components of the carrying appliance being so narrow perpendicular to the direction of projection that an objectionable darkening of the projected images does not occur if the carrying appliance comes within the reach of the rays.

6. Device for projecting the fixed stars, containing a carrying ring, stay wires adapted to suspend the carrying ring, a plurality of projection apparatus, each of which comprises an optical system and an image of a part of the fixed stars, which optical systems and images are so disposed that the projected images adjoin each other corresponding to the natural aspect, two hollow bodies, one group of the said projection apparatus being disposed at one and the other group being disposed at the other of these two hollow bodies, each hollow body containing a source of light common to all projection apparatus appertaining to this body, the said two hollow bodies being rigidly connected together and rotatably supported on the said carrying ring and means for rotating the said two hollow bodies.

7. Device for projecting stars, containing a plurality of projection devices, each of which comprises a casing, a pair of projection apparatus, fitted within the casing rotatable each about an axis approximately perpendicular to the axis of the apparatus, means for coupling each two apparatus forming a pair in such a way that the axes of these apparatus are inclined to each other at a small angle, and further comprising a gearing adapted to impart to the said projection apparatus rotations about their axes of rotation.

8. Device for projecting stars, containing a carrying appliance, a plurality of casings connected with each other, a plurality of projection apparatus, each of which is fitted within one of the casings rotatable about an axis, approximately perpendicular to the axis of the apparatus, a plurality of gearings, each of which is fitted within one of the casings and adapted to impart to the pertaining projection apparatus rotations about the axis of rotation of this apparatus, the device further containing a plurality of projection apparatus for projecting fixed stars, each of which comprises an optical system and an image of a part of the fixed stars, which optical systems and images are so disposed that the projected images adjoin each other corresponding to the natural aspect, two hollow bodies, one group of the said projection apparatus being disposed at one and the other group being disposed at the other of these two hollow bodies, each hollow body containing a source of light common to all projection apparatus appertaining to this body, the said two hollow bodies being rigidly connected together and rotatably supported on the said carrying appliance, means for connecting the said casings with the said two hollow bodies, and other means for rotating the said two hollow bodies.

9. Device for projecting stars, containing a carrying appliance, two groups of casings connected with each other, a plurality of projection apparatus, each of which is fitted within one of the casings rotatable about an axis approximately perpendicular to the axis of the apparatus, a plurality of gearings, each of which is fitted within one of the casings and adapted to impart to the pertaining projection apparatus rotations about the axis of rotation of this apparatus, the device further containing a plurality of projection apparatus for projecting fixed stars, each of which comprises an optical system and an image of a part of the fixed stars, which optical systems and images are so disposed that the projected images adjoin each other corresponding to the natural aspect, two hollow bodies, one group of the said projection apparatus being disposed at one and the other group being disposed at the other of these two hollow bodies, each hollow body containing a source of light common to all projection apparatus appertaining to this body, each of the said two groups of casings being connected with one of the said two hollow bodies, the two groups of casings and the two hollow bodies being rotatably supported on a body, this body being supported on the said carrying appliance rotatable about a horizontal axis, the two axes of rotation intersecting each other perpendicularly between the two hollow bodies, and means for rotating the said two hollow bodies relatively to the said body.

10. Device according to claim 9, the centre of gravity of the said body and of all parts fitted within it lying in the point of intersection of the said two axes.

11. Device for projecting stars, containing a carrying appliance, two groups of casings connected with each other, a plurality of projection apparatus, each of which is fitted within one of the casings rotatable about an axis approximately perpendicular to the axis of the apparatus, a plurality of gearings, each of which is fitted within one of the casings and adapted to impart to the pertaining projection apparatus rotations about the axis of rotation of this apparatus, the device further containing a plurality of projection apparatus for projecting fixed stars, each of which comprises an optical system and an image of a part of the fixed stars, which optical systems and images are so disposed that the projected images adjoin each other corresponding to the natural aspect, two hollow bodies, one group of the said projection apparatus being disposed at one and the other group being disposed at the other of these two hollow bodies, each hollow body containing a source of light common to all projection apparatus appertaining to this body, each of the said two groups of casings being connected with one of the said two hollow bodies, the two groups of casings and the two hollow bodies being rotatable on a carrying body, this carrying body being rotatably supported on another body, the two axes of rotation intersecting each other between the two hollow bodies and forming with each other an angle of about 23½°, the said other body being supported on the said carrying appliance rotatable about a horizontal axis lying in the plane determined by the two other axes of rotation and being perpendicular to the axis about which the said carrying body is rotatable relatively to the said other body, and means for rotating the said two hollow bodies relatively to the said body.

12. Device for projecting the fixed stars, containing a carrying appliance, a plurality of projection apparatus fitted on the said carrying appliance, and a source of light, the said projection apparatus being adapted to receive light emanated from the source of light, the device further containing other projection apparatus adapted to project circular lines.

13. In a device according to claim 2, a plurality of other projection apparatus, fixed on the said carrying body and adapted to project circular lines, each of which lines corresponds to a great circle of the fixed star sky perpendicular to one of the said two axes of rotation.

WALTER VILLIGER.
WALTHER BAUERSFELD.